KEYBOARD INPUT SYSTEM

Filed June 8, 1967

INVENTOR
JOHN V. BLANKENBAKER
BY HIS ATTORNEYS
HARRIS, KIECH, RUSSELL & KERN

United States Patent Office 3,483,553

Patented Dec. 9, 1969

3,483,553
KEYBOARD INPUT SYSTEM

John V. Blankenbaker, Los Angeles, Calif., assignor to Scantlin Electronics, Inc., Los Angeles, Calif., a corporation of Delaware Filed June 8, 1967, Ser. No. 644,594
Int. Cl. G06c 7/04
U.S. Cl. 340—365 7 Claims

ABSTRACT OF THE DISCLOSURE

A push button keyboard for rows and columns of keys, providing electrical readout without mechanical hold-down or interlocking mechanisms. An electrical circuit for reading the keyboard signals and rejecting multiple inputs from any column.

Figure 2:
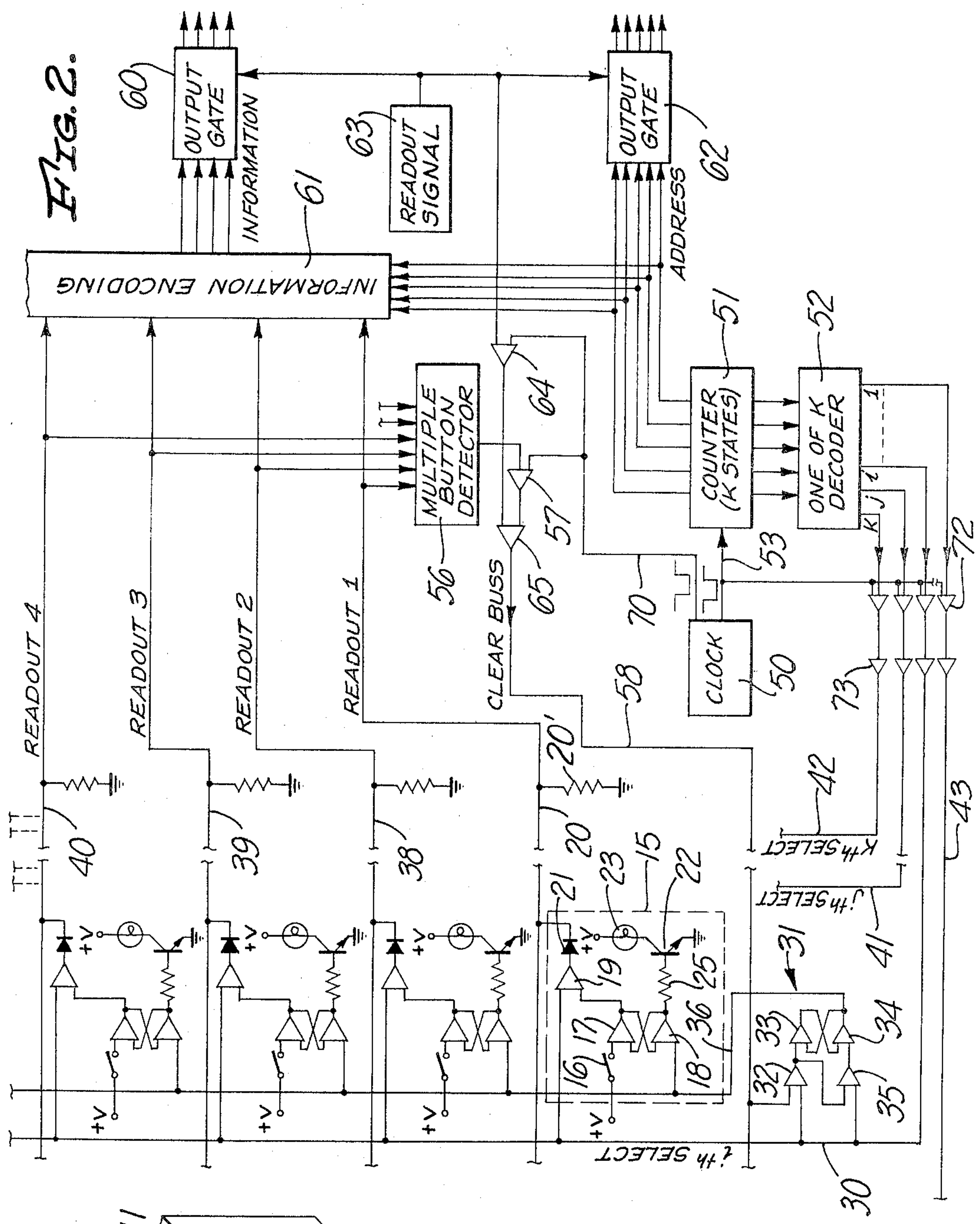

This invention relates to keyboard input systems for use with keyboards having the keys or push buttons arranged in a matrix of rows and columns. The typical 10 x 10 calculating machine keyboard is an example of the use of the input system but the invention is, of course, not limited to this particular arrangement. In a keyboard system, it is usually desired that not more than one key be actuated in each column and the equipment normally incorporates some form of mechanical hold-down arrangement for the keyboard buttons and some form of mechanical interlocking such that when one button of a column is pushed, other buttons in the column are released or blocked. The mechanical keyboards are expensive, usually complicated in design and assembly, and have some reliability problems. It is an object of the present invention to provide a new and improved keyboard input system which will provide the desired electrical outputs and which will eliminate the mechanical hold-down and interlocking mechanisms while achieving the operating requirement of having only one key per column effective.

It is a further object of the invention to provide a new and improved keyboard system which can operate with a simple momentary contact closure type of push button. An additional object is to provide such a system which can be utilized with any arrangement of keys or push buttons and which will permit the physical positioning of the push buttons in any orientation, with no requirement that interlocked buttons be maintained in physical alignment.

It is an object of the invention to provide a new and improved keyboard input system which will provide an electrical output indicating keyboard actuation continuously or on readout command, as desired. A further object is to provide such a system in which the electrical information can be coded in any desired form.

It is an object of the invention to provide a keyboard input system for generating an electrical output indicating the actuation of a plurality of push button switches or the like, including a series of switch units, a readout line for each switch unit, with each switch unit comprising a switch for generating a switch signal, storage means for storing the switch signal, and selection means for connecting the switch signal to the associated readout line on receipt of a select signal, means for connecting a select signal to each switch unit of the series at the same time for enabling the selection means to connect stored switch signals to the readout lines, and means for connecting a clear signal to each switch unit of the series to empty stored switch signals from the storage means.

It is a further object of the invention to provide such a system which may incorporate any number of additional series of switch units, with not more than one switch unit of each series associated with a readout line, with means for connecting the select signal and the clear signal for each switch unit of the additional series, and scanner means for sequentially generating select signals for each of the series of switch units.

It is an additional object of the invention to provide such a system including a detector having the readout lines as inputs and having means for generating a detector signal when there are switch signals on two output lines at the same time, with the means for connecting a clear signal including coincidence means having the select and detector signals as inputs for generating a clear signal when there is coincidence of the select and detector signals.

The invention also comprises novel combinations and arrangements of parts, which will more fully appear in the course of the following description. The drawing merely shows and the description merely describes a preferred embodiment of the present invention which is given by way of illustration or example.

Figure 1:
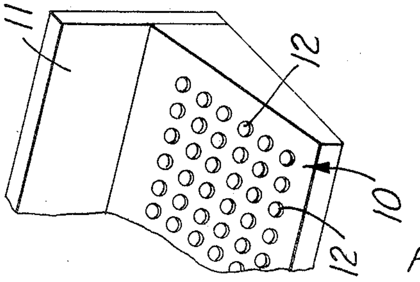

In the drawing:

FIG. 1 is an isometric view illustrating a portion of a keyboard incorporating the input system of the invention; and FIG. 2 is an electrical schematic of a preferred embodiment of the invention.

FIG. 1 illustrates the keyboard area 10 of the console 11 of a piece of equipment, with the keyboard comprising a plurality of push buttons 12 arranged in a plurality of vertically disposed columns. As will readily be seen from the description to follow, there is no requirement that the push buttons have any particular physical arrangement or that the columns be straight or vertical or in any other particular order. The word "column" as used herein refers to a series of push buttons where not more than one of the series is to be actuated at any time.

FIG. 2 illustrates a system with $k$ columns or series of switches, with the first four switches of the $i$th column illustrated in full. A complete switch unit is indicated at 15. A column may incorporate any number of switch units, and the overall system may incorporate any number of columns. There is no requirement that each column of a system have the same number of switch units.

The switch unit 15 includes a switch, a storage device, a selection device, and, when desired, an indicating device. The switch may be a conventional momentary close pair of contacts 16. The storage unit may be a flip-flop comprising a pair of back-to-back gates 17, 18. The selection unit may be a gate 19, with its output connected to a readout bus 20 via a blocking diode 21. A resistor 20' is connected between the readout bus 20 and circuit ground to insure that the bus voltage returns to the off or no-signal state when there is no signal through the blocking diodes 21. The indicating unit may comprise a transistor 22 for driving a lamp 23 .

In the particular logic system utilized in the circuit of FIG. 2, all the gates are the same type, with the following convention. If any input is high, the output is low, and if all inputs are low, the output is high. Of course other logic arrangements can be used if desired.

The switch 16 is actuated by a push button on the keyboard and serves to connect a positive voltage source to the set input of the flip-flop. When the flip-flop is set, the output of the gate 17 goes to ground and the output of the gate 18 goes positive. The output of the gate 18 is coupled to the transistor 22 through a resistor 25. When the flip-flop is set, by closing the switch 16, the indicator light 23 is energized. The particular polarities discussed are for the specific embodiment illustrated and a skilled worker in the art will be able to use other polarities and arrangements while following the teaching of the invention. There will be a similar switch unit for each push button of the keyboard.

The $i$th column includes a select line 30 which is connected as one input to the selection gate 19 of each switch unit of the column. The $i$th column also includes a clearing unit 31 incorporating a coincidental unit in the form of a setting gate 32, a resetting gate 35, and a flip-flop comprising a pair of back-to-back gates 33, 34. The output from the gate 34 is connected to a clear line 36 providing an input to the gate 18 of each switch unit of the column, for resetting the flip-flop and clearing the stored switch signal.

There will be a readout line for each switch unit of a column, here indicated as readout lines 20, 38, 39, 40. Each column will have a select line, a clearing unit, and an appropriate number of switch units, with each switch unit connected to one of the readout lines, the $j$th select line 41 and the $k$th select line 42 being illustrated along with the first select line 43.

A scanner system provides for sequentially generating the signals for each of the select lines and in the embodiment illustrated includes a clock or oscillator 50, a counter 51, and a decoder 52. The clock 50 generates a pulse train on line 53 as an input to the counter 51, with the pulse rate typically being in the range of a few kilocycles per second to a few megacycles per second. The counter 51 may be of conventional design and should have at least $k$ count states, that is, a count state for each column of the keyboard. The counter 51 drives a one of $k$ decoder 52 which provides an output pulse on each of the select lines in sequence. The counter and decoder are conventional circuit components and for example the counter may be a ring counter consisting of $k$ binary elements with the one of $k$ decoder being the output of the binary elements.

A detector unit 56 has inputs from each of the readout lines and provides an output to a gate 57 when two or more switch units of a column are actuated at the same time. The detector unit 56 may be a logic unit following conventional design practice and noting the fact that the condition of more than one switch unit actuated is the situation that are not zero switch units or not one switch unit is actuated. In logic language, this corresponds to the complement of no switch units actuated or one switch unit actuated. The output from the gate 57 appears on the clear bus 58 which is connected as an input to the gate 32 of the clearing unit 31 of each of the columns.

The readout lines may be connected directly as the output of the system or, alternatively, the readout lines may be connected to the system output through an output gate 60. In another alternative, the readout lines may be connected through an encoding unit 61 which typically would be a code translation network of conventional design. Address information also may be provided from the counter 51 directly to the system output, or through an output gate 62, and/or to the encoding unit 61, as desired. Readout from the system may be continuous or be provided on command. A typical arrangement for command of readout may utilize a readout signal unit 63, typically another push button on the keyboard, with the readout signal actuating the output gates 60, 62. The readout signal may also be connected onto the clear bus 58 through a gate 64 and a gate 65 for clearing all switch units after readout.

In discussing the operation of the system, assume that the storage flip-flops of all of the switch units are in the reset or clear condition. Actuation of one of the push buttons, say the push button switch 16 of the switch unit 15, sets the flip-flop 17, 18 and provides one input to the coincidence gate 19. Then when the $i$th column is selected by the scanner, a select signal (a ground signal in the embodiment illustrated) appears on the line 30. The select signal on the line 30 allows the coincidence or readout gates of each of the switch units of the $i$th column to be active and the state of the corresponding storage flip-flops is read onto the corresponding readout lines. Since the clock oscillator is running continuously, the counter is cycling continuously, and the various columns of switch units are being sequentially selected continuously. As each column is selected, the state of its switch unit storage flip-flops are read out onto the readout lines, appearing at the encoding unit 61, the output gate 60, or the system output, depending upon the particular output arrangement utilized.

If more than one button in a column is actuated, the storage flip-flop of each actuated switch unit will be set. When this column is selected, there will be an output on the readout lines associated with each of the actuated switch units. Under this condition, the output of the detector 56 will go true, indicating that more than one switch unit in a column has been actuated. This detector unit output is ANDED with a clock pulse on line 70, putting a clear signal on the clear bus 58. The clock pulse on the line 70 is in synchronism with the clock pulse on the line 53 and is slightly delayed so that the select signal will arrive at the clearing unit ahead of the clear signal, in order to prevent undesired setting of clearing units.

The timing can be improved, if desired, by adding coincidence gates 72 in each of the select lines, followed by gates 73 to restore the desired voltage convention. The clock pulse line 53 provides the other input to each of the gates 72 so that the select signal disappears or is cancelled before the clear signal disappears. Then there will be a period of time, before a new select signal is generated, in which the clear signal will terminate. The timing of the signals is: first, select; second, clear; third, cancellation of select; fourth, cancellation of clear. The refinement described in this paragraph is not essential to the system of the invention, but can be used in installations where timing problems are anticipated.

The clear signal on the line 58 coincides with the select signal on the line 30 providing an output from the gate 32 of the clearing unit 31, to set the flip-flop 33, 34 and thereby reset the flip-flops of each of the switch units of the column via the line 36. Hence the production of two conflicting signals is prevented, providing the same result as is achieved with the mechanical interlocking of a column of push buttons.

If the later actuated push button is still being pushed when the column is again selected, an output is produced only on one readout line in the usual manner. This will always be the case, since the system will cycle several times in the time required to depress and release a key or push button. When two or more buttons of a column are pushed simultaneously, the operation is as described above with the flip-flops of each switch unit of the column being held in the clear or reset position by the clear signal until not more than one push button is being depressed.

As mentioned above, a readout signal unit 63 can be used to control readout from the system. Alternatively, continuous readout can be provided. If desired, the readout signal unit can also be used to clear the switch units after a readout, as by combining the readout signal from the unit 63 with the clock pulse on the line 70 at the gate 64 to provide a signal for the clear bus 58.

In a typical installation with a ten-column keyboard, the clock frequency may be selected at one megacycle per second, with the complete keyboard being scanned in ten microseconds. Ten microseconds is very fast as compared to the time required to manually actuate a pushbutton and the time required to heat the filament of an indicator lamp.

The input system of the invention provides the equivalent of the hold-down of a push button by storing the switch signal generated by pushbutton actuation. The system also provides for interlocking between buttons of a column by clearing multiple inputs and retaining the last input. The system also provides for readout of the information in electrical form and available for manipulation in any desired manner.

I claim:

1. In a keyboard input system for generating an electrical output indicating the actuation of a plurality of push button switches or the like, the combination of:
- a first series of switch units;
- a readout line for each switch unit, each switch unit comprising a switch for generating a switch signal, storage means for storing said switch signal, and selection means for connecting said switch signal to the associated readout line on receipt of a select signal;
- means for cyclically generating a select signal and a clear check signal in sequence;
- means for connecting said select signal to each switch unit of said first series at the same time for enabling the selection means to connect stored switch signals to the readout lines;
- a detector having said readout lines as inputs and having means for generating a detector signal when there are switch signals on two output lines at the same time;
- coincidence means having said clear check and detector signals as inputs for generating a clear signal where there is coincidence of said clear check and detector signals; and
- means for connecting said clear signal to each switch unit of said first series to empty stored switch signals from the storage means.

2. A system as defined in claim 1 including:
- a plurality of additional series of switch units, with not more than one switch unit of each series associated with a readout line;
- means for connecting a select signal to each switch unit of an additional series at the same time for enabling the selection means of a series of switch units to connect stored switch signals to the readout lines;
- said means for generating including a scanner means for sequentially generating select signals for each of said series of switch units; and
- said means for connecting including means for connecting said clear signal to each switch unit of each of said additional series to empty stored switch signals from the storage means of the switch units of each series.

3. A system as defined in claim 2 including:
- means for generating a readout signal; and
- an output gate controlled by said readout signal for coupling signals from said readout lines to the system output; and
- with said coincidence means of each of said means for connecting a clear signal having said readout signal as an input in parallel with said detector signal and generating a clear signal when there is coincidence of said clear check and readout signals.

4. A system as defined in claim 1 in which each of said switch units includes indicator means and means for actuating said indicator means when a switch signal is stored in said storage means.

5. A system as defined in claim 1 in which each of said switch units includes a flip-flop as the storage means, with the switch and clear signals as inputs, and a coincidence gate as the selection means, with the select signal and a flip-flop output as inputs to the coincidence gate.

6. A system as defined in claim 2 in which each of said switch units includes a flip-flop as the storage means, with the switch and clear signals as inputs, and a coincidence gate as the selection means, with the select signal and a flip-flop output as inputs to the coincidence gate.

7. A system as defined in claim 2 in which said scanner means includes a counter with a count state for each series of switch units and a pulse source as an input to said counter.

References Cited

UNITED STATES PATENTS

| | | | |
|---|---|---|---|
| 3,244,369 | 4/1966 | Nassimbene | 340—365 |
| 3,359,366 | 12/1967 | Magleby | 178—30 |

THOMAS A. ROBINSON, Primary Examiner

U.S. Cl. X.R.

178—17; 179—90; 235—145

PO-1050
(5/69)

UNITED STATES PATENT OFFICE
CERTIFICATE OF CORRECTION

Patent No. 3,483,553 Dated December 9, 1969

Inventor(s) John V. BLANKENBAKER

It is certified that error appears in the above-identified patent and that said Letters Patent are hereby corrected as shown below:

Col. 3: Line 6, "coincidental" should be --coincidence--, pg. 7, 1.1;

Line 42, delete "are" after "that", pg. 8, 1.1;

Col. 5: Line 23, "where" should be --when--, claim 1, amended, 1. 21.

SIGNED AND SEALED
JUN 9 1970

(SEAL)
Attest:

Edward M. Fletcher, Jr.
Attesting Officer

WILLIAM E. SCHUYLER, JR.
Commissioner of Patents